United States Patent
Shaffer et al.

(10) Patent No.: US 9,185,555 B2
(45) Date of Patent: Nov. 10, 2015

(54) METHOD FOR AUTHENTICATION OF A WIRELESS BACKUP SYSTEM FOR AN OPTICAL NETWORK UNIT

(75) Inventors: Michael Shaffer, Longwood, FL (US); Meng Sui, Shenzhen (CN); Wei Lin, Shenzhen (CN)

(73) Assignee: Futurewei Technologies, Inc., Plano, TX (US)

(*) Notice: Subject to any disclaimer, the term of this patent is extended or adjusted under 35 U.S.C. 154(b) by 819 days.

(21) Appl. No.: 13/089,707

(22) Filed: Apr. 19, 2011

(65) Prior Publication Data
US 2011/0262129 A1    Oct. 27, 2011

Related U.S. Application Data

(60) Provisional application No. 61/326,848, filed on Apr. 22, 2010.

(51) Int. Cl.
*H04L 9/32* (2006.01)
*G06F 15/173* (2006.01)
(Continued)

(52) U.S. Cl.
CPC ............. *H04W 12/06* (2013.01); *H04B 10/272* (2013.01); *H04Q 11/0067* (2013.01); *H04L 41/0654* (2013.01); *H04Q 2011/0079* (2013.01); *H04Q 2011/0088* (2013.01); *H04W 24/04* (2013.01)

(58) Field of Classification Search
CPC ............ H04L 41/0677; H04L 41/0654; H04L 41/0659; H04L 41/0663; H04L 41/0668; H04L 41/0672; H04L 45/22; H04L 12/2697; H04L 12/2856; H04L 43/50; H04Q 11/0067; H04Q 2011/0081; H04Q 11/0478; H04Q 2011/0079; H04Q 2011/0086; H04Q 2011/0083; H04Q 2213/13515; H04J 14/0227

USPC .......... 713/168–170; 709/223–225, 227, 228, 709/238, 239
See application file for complete search history.

(56) References Cited

U.S. PATENT DOCUMENTS

| | | | | |
|---|---|---|---|---|
| 5,936,578 | A | * | 8/1999 | Driessen et al. ............... 342/374 |
| 6,763,195 | B1 | * | 7/2004 | Willebrand et al. ........... 398/115 |

(Continued)

FOREIGN PATENT DOCUMENTS

| | | |
|---|---|---|
| CN | 101051854 A | 10/2007 |
| CN | 101431702 A | 5/2009 |

(Continued)

OTHER PUBLICATIONS

"Gigabit-Capable Passive Optical Networks (GPON): General Characteristics, Series G: Transmission Systems and Media, Digital Systems and Networks, Digital Sections and Digital Line System—Optical Line Systems for Local and Access Networks," ITU-T G.984.1, Mar. 2008, 43 pages.

(Continued)

*Primary Examiner* — Tae Kim
(74) *Attorney, Agent, or Firm* — Conley Rose, P.C.; Grant Rodolph; Jonathan K. Polk

(57) ABSTRACT

An apparatus comprising a first passive optical network (PON) component configured to couple to a second PON component via an optical link and authenticate the second PON component based on authentication information to authorize a backup wireless link between the first PON component and the second PON component. The backup wireless link corresponds to a wireless backup system for the PON. The authentication information is associated with an identifier of the wireless backup system. Also included is a network component comprising a first passive optical network (PON) component configured to receive authentication information for a wireless backup system for a PON from a second PON component and compare the authentication information to expected authentication information at the first PON component to authorize a wireless link between the first PON component and the second PON component for the wireless backup system.

16 Claims, 14 Drawing Sheets

(51) Int. Cl.
*H04W 12/06* (2009.01)
*H04B 10/272* (2013.01)
*H04Q 11/00* (2006.01)
*H04L 12/24* (2006.01)
*H04W 24/04* (2009.01)

(56) References Cited

U.S. PATENT DOCUMENTS

| | | | |
|---|---|---|---|
| 7,110,678 B2* | 9/2006 | Willebrand et al. | 398/115 |
| 7,274,877 B1* | 9/2007 | Britz et al. | 398/115 |
| 7,453,835 B1* | 11/2008 | Coty et al. | 370/310 |
| 7,730,305 B2* | 6/2010 | Eun et al. | 713/168 |
| 7,903,544 B2* | 3/2011 | Shivnan | 370/218 |
| 2003/0091045 A1* | 5/2003 | Choi et al. | 370/390 |
| 2004/0179521 A1* | 9/2004 | Kim et al. | 370/384 |
| 2005/0192007 A1* | 9/2005 | Kumar et al. | 455/433 |
| 2006/0129814 A1* | 6/2006 | Eun et al. | 713/168 |
| 2006/0227794 A1* | 10/2006 | Shivnan | 370/400 |
| 2007/0092256 A1* | 4/2007 | Nozue et al. | 398/72 |
| 2009/0047016 A1* | 2/2009 | Bernard et al. | 398/43 |
| 2009/0049532 A1* | 2/2009 | Gao et al. | 726/5 |
| 2009/0097846 A1* | 4/2009 | Kozischek et al. | 398/20 |
| 2009/0232495 A1* | 9/2009 | Shi et al. | 398/43 |
| 2009/0249067 A1* | 10/2009 | Lie et al. | 713/167 |
| 2009/0268606 A1* | 10/2009 | DeLew et al. | 370/216 |
| 2009/0269063 A1* | 10/2009 | Bernard et al. | 398/66 |
| 2009/0304385 A1* | 12/2009 | Khermosh | 398/58 |
| 2009/0319572 A1 | 12/2009 | Bernard | |
| 2010/0158525 A1* | 6/2010 | Walter | 398/71 |
| 2010/0272259 A1* | 10/2010 | Kim et al. | 380/256 |
| 2011/0029773 A1* | 2/2011 | Effenberger | 713/168 |
| 2011/0214160 A1* | 9/2011 | Costa et al. | 726/3 |

FOREIGN PATENT DOCUMENTS

| | | | |
|---|---|---|---|
| CN | 101557288 A | | 10/2009 |
| EP | 1185129 A2 | | 6/2002 |
| EP | 1458164 A2 | | 9/2004 |
| JP | 2010016720 A | * | 1/2010 |

OTHER PUBLICATIONS

"10-Gigabit-Capable Passive Optical Networks (XG-PON): General Requirements, Series G: Transmission Systems and Media, Digital Systems and Networks, Digital Section and Digital Line System—Optical Line Systems for Local and Access Networks," ITU-T G.987.1, Jan. 2010, 52 pages.

"Broadband Optical Access Systems Based on Passive Optical Networks (PON), Series G: Transmission Systems and Media, Digital Systems and Networks, Digital Section and Digital Line System—Optical Line Systems for Local and Access Networks," ITU-T G.983.1, Feb. 2005, 124 pages.

"Gigabit-Capable Passive Optical Networks (G-PON): Transmission Convergence Layer Specification, Series G: Transmission Systems and Media, Digital Systems and Networks, Digital Sections and Digital Line System—Optical Line Systems for Local and Access Networks," ITU-T G.984.3, Mar. 2008, 146 pages.

"10 Gigabit-Capable Passive Optical Networks (XG-PON): Transmission Convergence (TC) Layer Specification, Series G: Transmission Systems and Media, Digital Systems and Networks, Digital Sections and Digital Line System—Optical Line Systems for Local and Access Networks," ITU-T G. 987.3, Oct. 2010, 134 pages.

Foreign Communication From a Related Counterpart Application, European Application 11771594.6, Extended European Search Report dated Mar. 13, 2013, 9 pages.

Murakami, K., "Authentication and Encryption in EPON," Internet Citation, XP007901700, http://www.ieee802.org/3/efm/public/jul02/p2mp/murakami_p2mp_1_0702.pdf, Jul. 2002, 22 pages.

Sun-Sik, R. et al, "Security Model and Authentication Protocol in EPON-based Optical Access Network," Transparent Optical Networks, 2003, Proceedings of 2003 5th International Coference on Warsaw, Poland, IEEE, vol. 1, XP010681404, Jun. 29-Jul. 3, 2003, pp. 99-102.

"Gigabit-capable Passive Optical Networks (GPON): General Characteristics," G.984.1 ITU-T Standard, International Telecommunication Union, Geneva, CH, XP017436617, Mar. 29, 2008, 32 pages.

Foreign Communication From a Related Counterpart Application, PCT Application PCT/CN2011/073155, International Search Report dated Jul. 21, 2011, pp. 1-6.

Foreign Communication From a Related Counterpart Application, PCT Application PCT/CN2011/073155, Written Opinion dated Jul. 21, 2011, pp. 1-6.

Foreign Communication From a Counterpart Application, Chinese Application No. 201180020334.X, Chinese Office Action dated Feb. 4, 2015, 8 pages.

Foreign Communication From a Counterpart Application, Chinese Application No. 201180020334.X, Chinese Search Report dated Dec. 26, 2014, 2 pages.

* cited by examiner

METHOD FOR AUTHENTICATION OF A WIRELESS BACKUP SYSTEM FOR AN OPTICAL NETWORK UNIT

CROSS-REFERENCE TO RELATED APPLICATIONS

The present application claims the benefit of U.S. Provisional Patent Application No. 61/326,848 filed Apr. 22, 2010 by Michael Schaffer and entitled "Method for Authentication of an Alternate Service and Control Channel for an ONU," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A passive optical network (PON) is one system for providing network access over "the last mile." The PON is a point to multi-point network comprised of an optical line terminal (OLT) at the central office, an optical distribution network (ODN), and a plurality of optical network units (ONUs) at the customer premises. In some PON systems, such as Gigabit PON (GPON) systems, downstream data is broadcasted at about 2.5 Gigabits per second (Gbps) while upstream data is transmitted at about 1.25 Gbps. A ten gigabit per second (Gbps) GPON (XGPON) system may have a downstream bandwidth of about ten Gbps and an upstream bandwidth of at least about 2.5 Gbps. A PON system may lose its service availability upon failure of the fiber links and/or a plant infrastructure component. The use of the wireless system as an external backup system requires authentication.

SUMMARY

In one embodiment, the disclosure includes an apparatus comprising a first PON component configured to couple to a second PON component via an optical link and authenticate the second PON component based on authentication information to authorize a backup wireless link between the first PON component and the second PON component, wherein the backup wireless link corresponds to a wireless backup system for the PON, and wherein the authentication information is associated with an identifier of the wireless backup system.

In another embodiment, the disclosure includes a network component comprising a first passive optical network (PON) component configured to receive authentication information for a wireless backup system for a PON from a second PON component and compare the authentication information to expected authentication information at the first PON component to authorize a wireless link between the first PON component and the second PON component for the wireless backup system.

In a third aspect, the disclosure includes a method comprising receiving a downstream authentication information associated with a wireless backup system for a passive optical network (PON); authorizing a wireless backup link if expected authentication information for the wireless backup system is substantially similar to the downstream authentication information; and not establishing the wireless backup link if the expected authentication information for the wireless backup system is not substantially similar to the downstream authentication information.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

PON systems may provide high level bit-rate communication links in the downstream and in the upstream direction. To improve system resilience, a backup system may be used to provide a backup communication link, e.g., in case a PON system loses a communication link or service availability. A duplication of at least part of the fiber tree between the OLT and the ONUs may be used to provide backup but may increase cost and maintenance requirements for the PON system. Instead, an external access system may be used as a backup system, such as a wireless system, a digital subscriber line (DSL) system, or a hybrid fiber coaxial network. For example, a wireless system may be added to the ONU device in the form of a plug-and-play device or may be integrated into the ONU. The backup system may require authentication between the OLT and the ONU, before using a backup communication link. An "external access backup architecture" is described in the International Telecommunication Union (ITU) Standardization Sector (ITU-T) G.984.1 and in the ITU-T G.987.1 standards, both of which are incorporated herein by reference. However, the standards do not provide operational details about the authentication of backup systems.

Disclosed herein are systems and methods for authenticating a wireless system, which may be used as an external backup system for a PON system. A wireless backup system may be authenticated using a PON link between an ONT and an ONU. Either one of the OLT or the ONU may act as the authenticator of a backup wireless link. The authentication may be based on receiving authentication information associated with the wireless system and determining whether the system is valid based on this information. The authentication methods may be implemented using extensions to PON management channels, such as a Physical Layer Operations, Administration and Maintenance (PLOAM) channel, an Optical network terminal Management and Control Interface (OMCI) channel, a Multi-Point Control Protocol (MPCP), and/or an Ethernet Operations, Administration and Maintenance (OAM) protocol.

Figure 1:
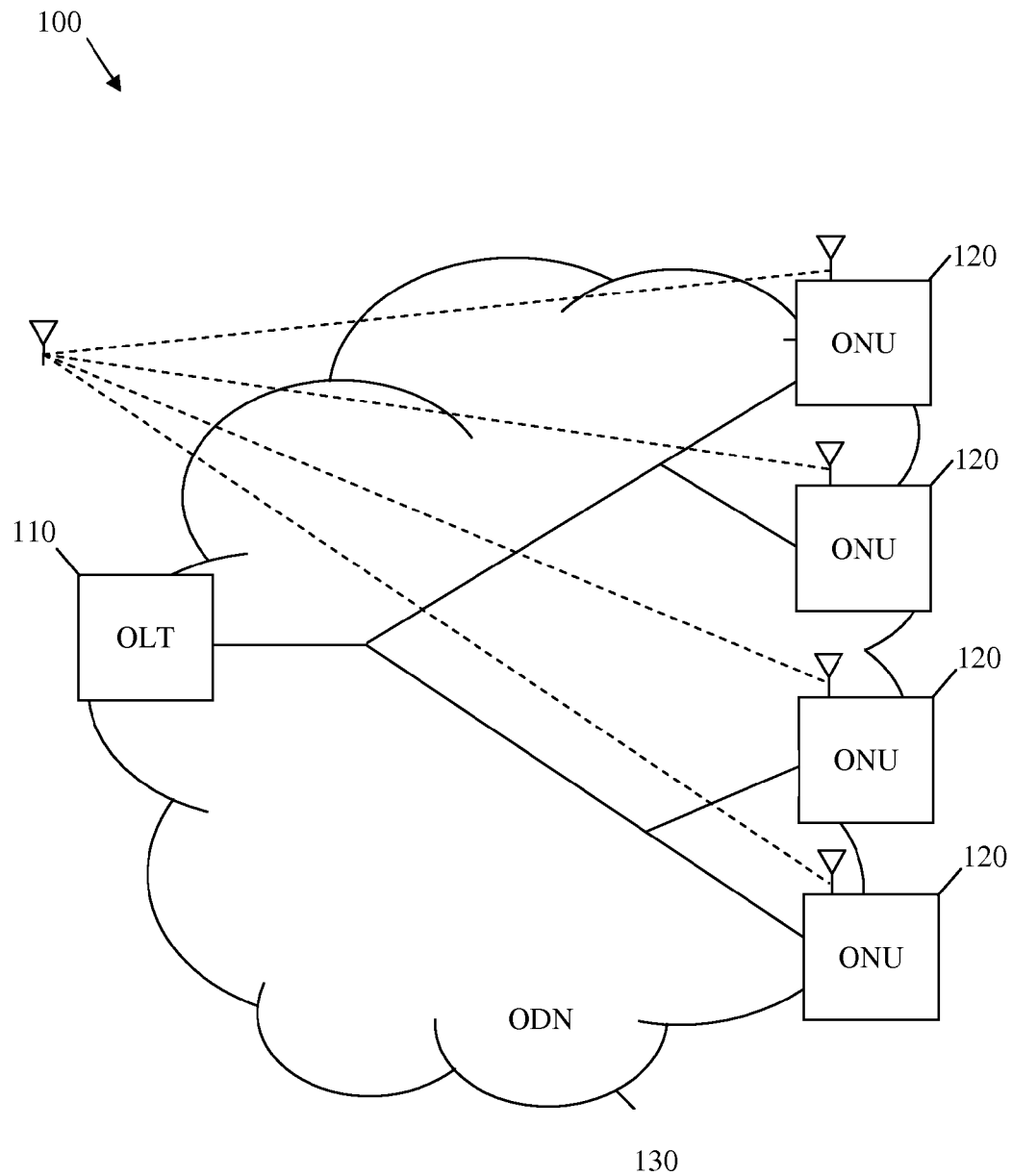
FIG. 1 is a schematic diagram of an embodiment of a PON.

FIG. 1 illustrates one embodiment of a PON 100. The PON 100 comprises an OLT 110, a plurality of ONUs 120, and an ODN 130, which may be coupled to the OLT 110 and the ONUs 120. The PON 100 may be a communications network that does not require any active components to distribute data between the OLT 110 and the ONUs 120. Instead, the PON 100 may use the passive optical components in the ODN 130 to distribute data between the OLT 110 and the ONUs 120. In an embodiment, the PON 100 may be a Next Generation Access (NGA) system, such as a ten gigabit per second (Gbps) GPON (XGPON), which may have a downstream bandwidth of about ten Gbps and an upstream bandwidth of at least about 2.5 Gbps. Alternatively, the PON 100 may be any Ethernet based network, such as an Ethernet PON (EPON) defined by the Institute of Electrical and Electronics Engineers (IEEE) 802.3ah standard, a ten Gigabit EPON as defined by the IEEE 802.3av standard, an asynchronous transfer mode PON (APON), a broadband PON (BPON) defined by the ITU-T G.983 standard, a GPON defined by the ITU-T G.984 standard, or a wavelength division multiplexed (WDM) PON (WPON), all of which are incorporated herein by reference as if reproduced in their entirety.

In an embodiment, the OLT 110 may be any device that is configured to communicate with the ONUs 120 and another network (not shown). Specifically, the OLT 110 may act as an intermediary between the other network and the ONUs 120. For instance, the OLT 110 may forward data received from the network to the ONUs 120, and forward data received from the ONUs 120 onto the other network. Although the specific configuration of the OLT 110 may vary depending on the type of PON 100, in an embodiment, the OLT 110 may comprise a transmitter and a receiver. When the other network is using a network protocol, such as Ethernet or Synchronous Optical Networking/Synchronous Digital Hierarchy (SONET/SDH), that is different from the PON protocol used in the PON 100, the OLT 110 may comprise a converter that converts the network protocol into the PON protocol. The OLT 110 converter may also convert the PON protocol into the network protocol. The OLT 110 may be typically located at a central location, such as a central office, but may be located at other locations as well.

In an embodiment, the ONUs 120 may be any devices that are configured to communicate with the OLT 110 and a customer or user (not shown). Specifically, the ONUs 120 may act as an intermediary between the OLT 110 and the customer. For instance, the ONUs 120 may forward data received from the OLT 110 to the customer, and forward data received from the customer onto the OLT 110. Although the specific configuration of the ONUs 120 may vary depending on the type of PON 100, in an embodiment, the ONUs 120 may comprise an optical transmitter configured to send optical signals to the OLT 110 and an optical receiver configured to receive optical signals from the OLT 110. Additionally, the ONUs 120 may comprise a converter that converts the optical signal into electrical signals for the customer, such as signals in the Ethernet or asynchronous transfer mode (ATM) protocol, and a second transmitter and/or receiver that may send and/or receive the electrical signals to a customer device. In some embodiments, ONUs 120 and optical network terminals (ONTs) are similar, and thus the terms are used interchangeably herein. The ONUs may be typically located at distributed locations, such as the customer premises, but may be located at other locations as well.

Another component of the PON 100 may be the ODN 130. The ODN 130 is a data distribution system that may provide communication links between the OLT 110 and the ONUs 120 and may comprise optical fiber cables, couplers, splitters, distributors, and/or other equipment. In an embodiment, the optical fiber cables, couplers, splitters, distributors, and/or other equipment are passive optical components. Specifically, the optical fiber cables, couplers, splitters, distributors, and/or other equipment may be components that do not require any power to distribute data signals between the OLT 110 and the ONUs 120. The ODN 130 typically extends from the OLT 110 to the ONUs 120 in a branching configuration as shown in FIG. 1, but may be alternatively configured in any other configuration.

It may be desired to provide a backup system to the PON 100, e.g. to account for any losses in communication links between the OLT 110 and the ONUs 120. A wireless backup system that provides backup wireless links between the OLT 110 and the ONUs 120 may be implemented. For instance, the wireless backup system may comprise a wireless communication device coupled to or located at the ONU 120 and similarly another wireless communication device at the OLT 110. The wireless device may be a plug-and-play device or may be a built-in device at the OLT 110/ONU 120. The backup wireless links may be activated between the OLT 110 and an ONU 120 if the optical link (e.g., on a fiber) is lost. For instance, one or more ONUs 120 may comprise a wireless transceiver coupled to an antenna for establishing a backup wireless link with the OLT 110, which may also comprise a transceiver coupled to an antenna, as shown in FIG. 1. The backup wireless link (indicated by the dashed line in FIG. 1) may be established directly between the ONU 120 and the OLT 110 or via one or more wireless towers or a wireless network (not shown). To ensure network security, the backup wireless links may require authentication, e.g., to verify that only authorized ONUs 120 can link to the OLT 110. The authentication of a backup wireless link may be implemented between the corresponding OLT 110 and ONU 120. An authenticator, e.g., the OLT 110 or the ONU 120, may verify authentication information coupled to or at the ONU 120/OLT 110 to enable a wireless device, and hence activate the wireless link.

Figure 2:
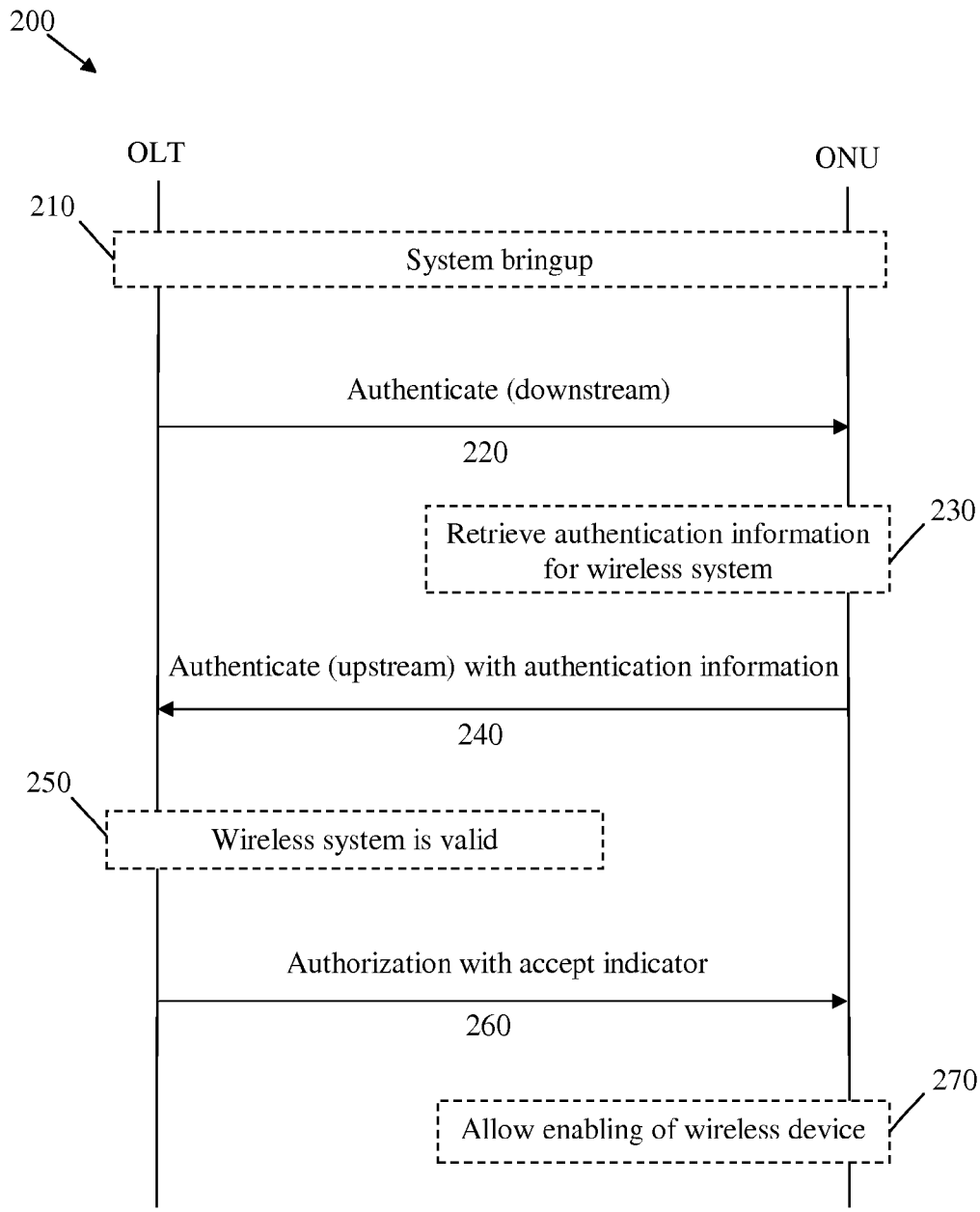
FIG. 2 is a schematic diagram of an embodiment of an authentication method.

FIG. 2 illustrates an embodiment of an authentication method 200 that may be used between an OLT and an ONU in a PON, e.g., the PON 100. The authentication method 200 may be initiated by the OLT, e.g., the OLT 110. The authentication method 200 may begin at step 210, where the OLT and ONU may perform a system bringup operation. System bringup may comprise, for example, an initialization of a plurality of hardware and software components comprised in the OLT and ONU. At step 220, the OLT may send a downstream authenticate message to the ONU. The downstream authenticate message may comprise a request for an authentication information associated with a wireless backup system for the PON. The authentication information may be unique to allow the PON to verify the use of an authorized wireless device and network. For example, the downstream authenticate message may comprise a request for at least a part of an identifier associated with the wireless system.

At step 230, the ONU may retrieve an authentication information associated with the wireless backup system. In an embodiment, the wireless backup system may comprise a third generation (3G) system or a fourth generation (4G) system, and the expected authentication information may comprise at least the first four bytes of an International Mobile Subscriber Identity (IMSI) of a 3G card. The authentication information may be retrieved from the wireless device coupled to the ONU, e.g., after the ONU power-up or may be read directly from the wireless device. For example, the ONU may retrieve an identifier from a memory component associated with the wireless device.

At step 240, the ONU may send an upstream authenticate message comprising the retrieved authentication information. At step 250, the OLT may determine that the wireless system is valid. For example, the OLT may compare the authentication information to an expected authentication information or credential information of the ONU. In an embodiment, the OLT may determine the validity of the wireless system based on a plurality of criteria that are specific to the OLT or using a separate (e.g., higher layer) server in the PON. At step 260, the OLT may send a message comprising an authorization with an accepted indicator. The accepted indicator may indicate a permission to enable the wireless device. At step 270, the ONU may enable the wireless device, and hence the wireless link between the OLT and the ONU may be activated.

Figure 3:
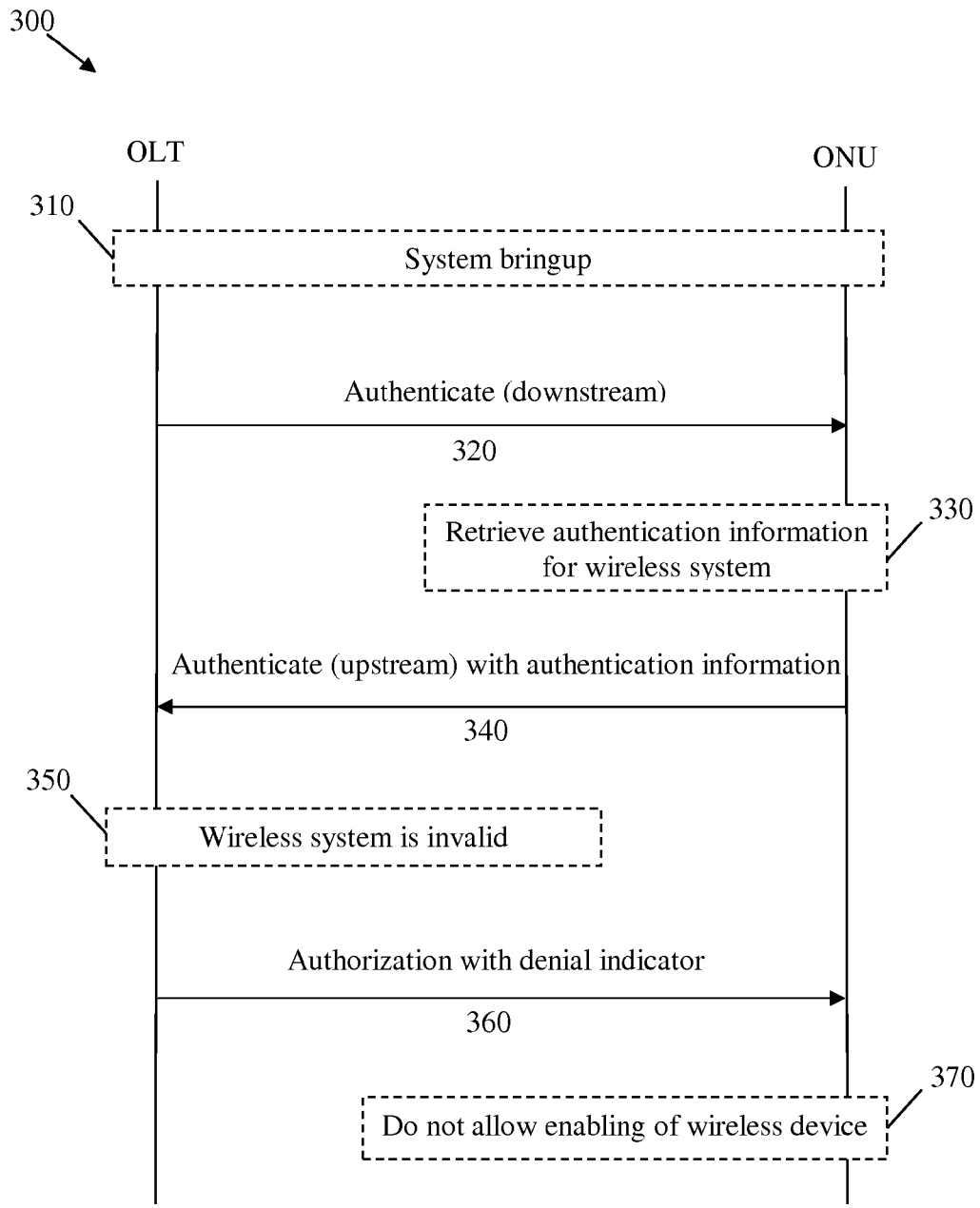
FIG. 3 is a schematic diagram of another embodiment of an authentication method.

FIG. 3 illustrates another embodiment of an authentication method 300 that may be used between the OLT and the ONU. The authentication method 300 may be initiated by the OLT, e.g., the OLT 110. The steps 310, 320, 330, and 340 of the method 300 may be substantially similar to the steps 210, 220, 230, and 240, respectively. At step 350, the OLT may determine that the wireless system is invalid. For example, the OLT may receive the upstream authenticate message from the ONU, and compare authentication information in the upstream authenticate message to expected authentication information. The criteria for determining validity may be similar to the criteria of step 250. At step 360, the OLT may send a message comprising an authorization with a denial indicator. The denial indicator may indicate a rejection to authorizing the ONU and hence a rejection to enable the wireless device. At step 370, the ONU may not enable the wireless device, and hence the wireless link between the OLT and the ONU may not be activated.

Figure 4:
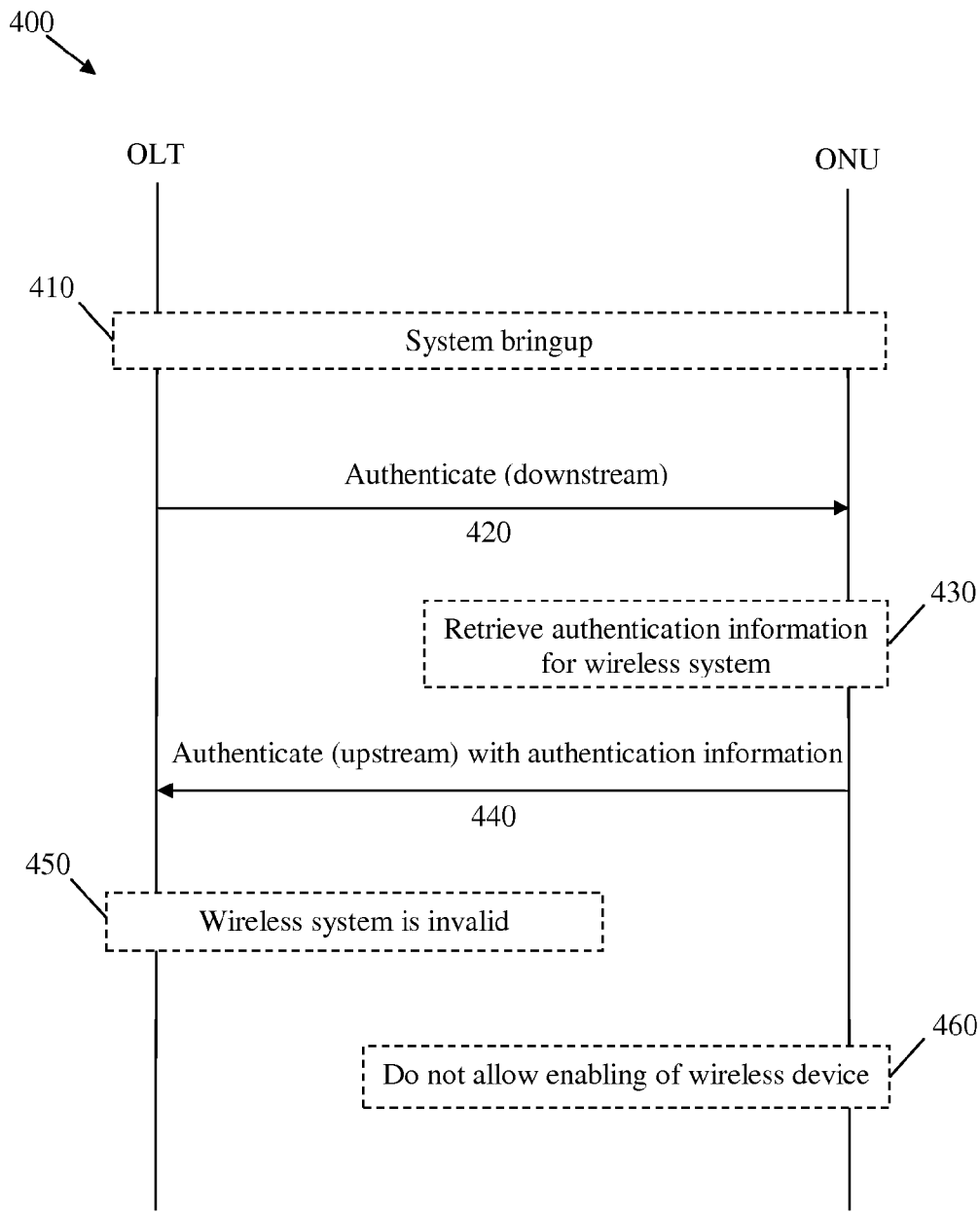
FIG. 4 is a schematic diagram of another embodiment of an authentication method.

FIG. 4 illustrates another embodiment of an authentication method 400 that may be used between the OLT and the ONU. The authentication method 400 may be initiated by the OLT, e.g., the OLT 110. In the method 400, the steps 410, 420, 430, 440, 450, and 460 may be substantially similar to the steps 210, 220, 230, 240, 350, and 370 above, respectively. The method 400 may progress from step 450 to step 460 after a timeout period at the ONU after sending an upstream authenticate message.

Figure 5:
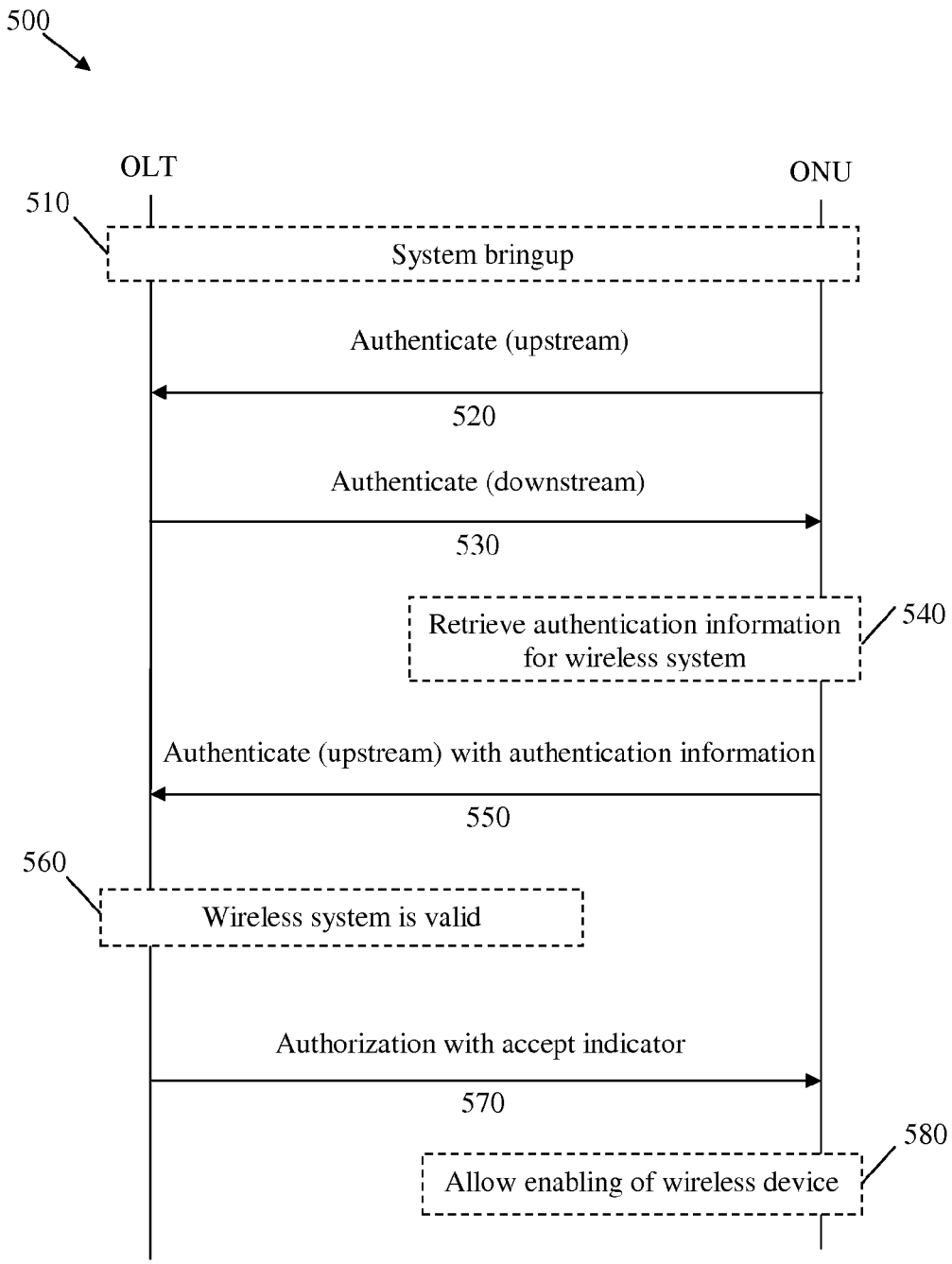
FIG. 5 is a schematic diagram of another embodiment of an authentication method.

FIG. 5 illustrates another embodiment of an authentication method 500 that may be used between the OLT and the ONU. The authentication method 500 may be initiated by the ONU, e.g., the ONU 120. In the method 500, the steps 510, 530, 540, 550, 560, 570, and 580 may be substantially similar to the steps 210, 320, 330, 240, 250, 260, and 270 above, respectively. Additionally, at step 520, the ONU may send an upstream authenticate message to the OLT. The upstream authenticate message may comprise a request for an authentication information associated with a wireless system.

Figure 6:
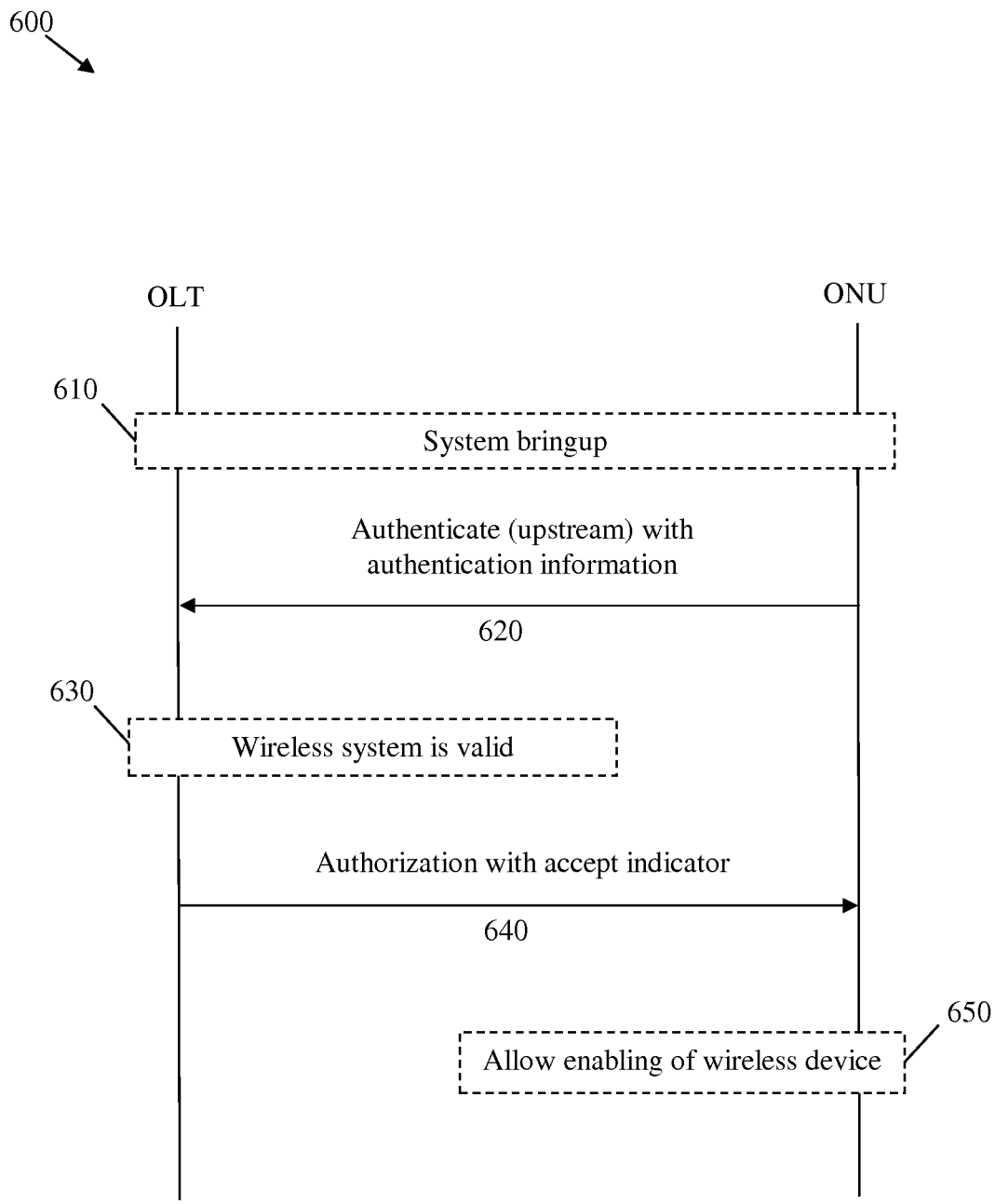
FIG. 6 is a schematic diagram of another embodiment of an authentication method.

FIG. 6 illustrates another embodiment of an authentication method 600 that may be used between the OLT and the ONU. The authentication method 600 may be initiated by the ONU, e.g., the ONU 120. In the method 600, the steps 610, 620, 630, 640, and 650 may be substantially similar to the steps 210, 240, 250, 260, and 270 above, respectively.

Figure 7:
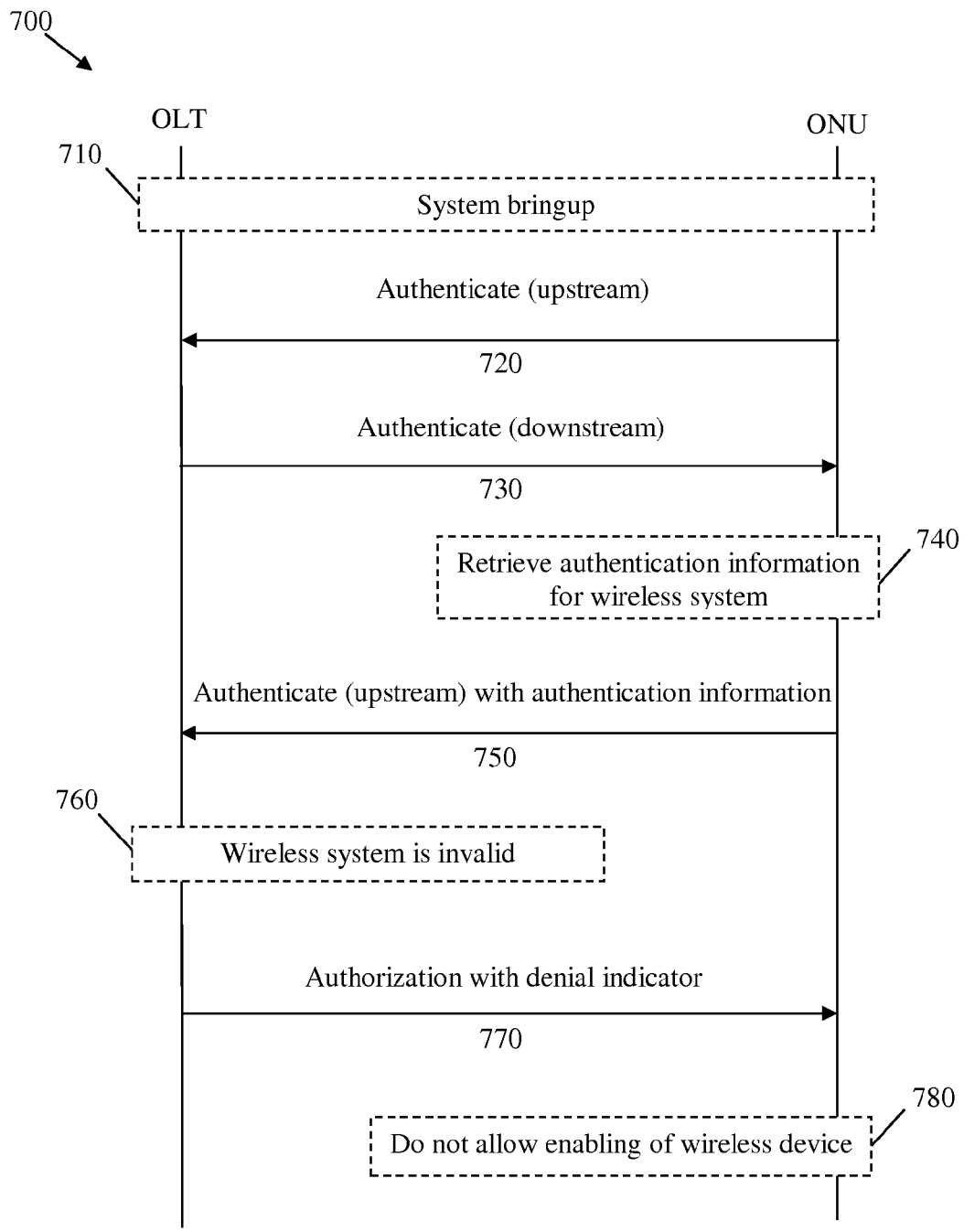
FIG. 7 is a schematic diagram of another embodiment of an authentication method.

FIG. 7 illustrates another embodiment of an authentication method 700 that may be used between the OLT and the ONU. The authentication method 700 may be initiated by the ONU, e.g., the ONU 120. In the method 700, the steps 710, 720, 730, 740, 750, 760, 770, and 780 may be substantially similar to the steps 210, 520, 530, 230, 340, 350, 360, and 370 above, respectively.

Figure 8:
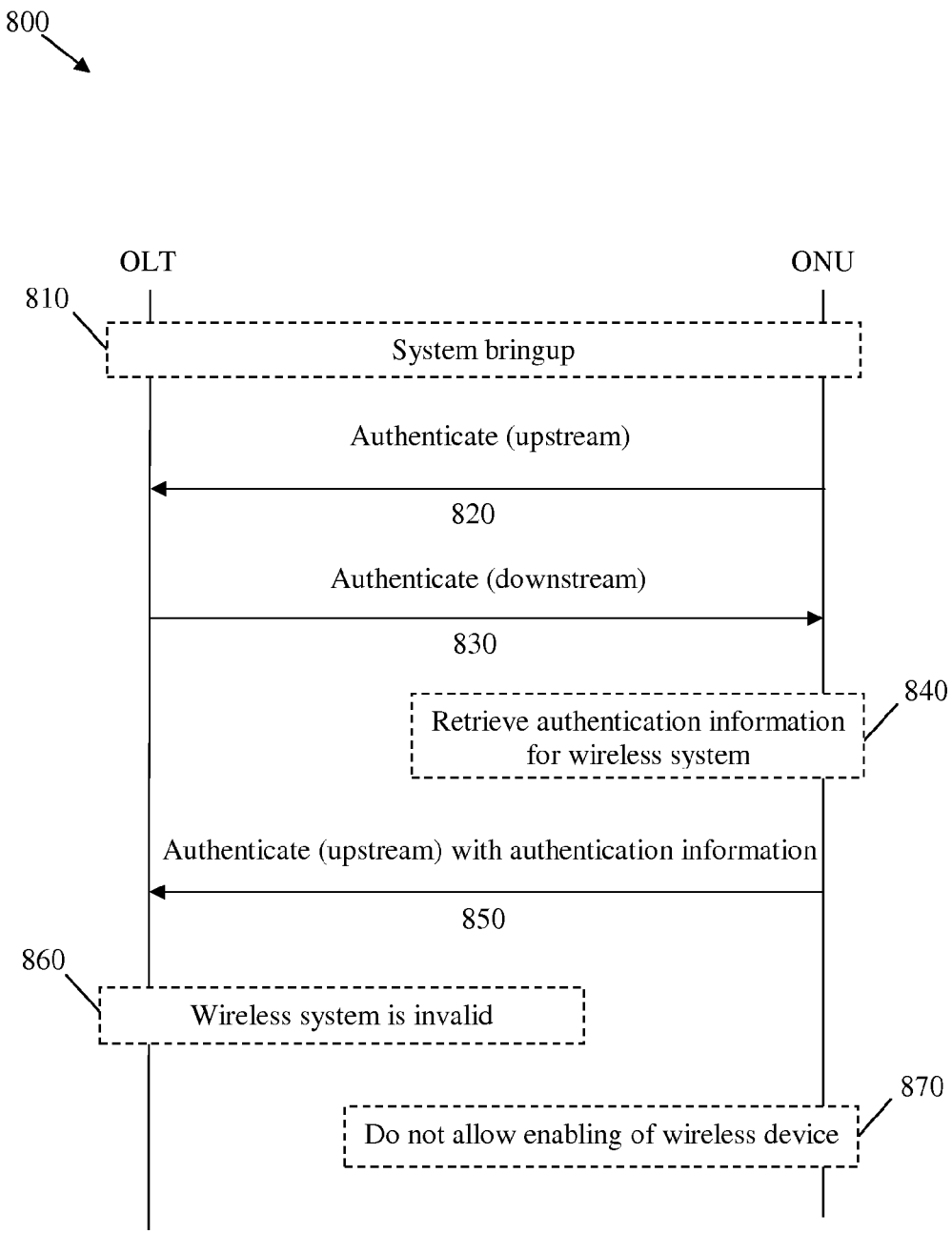
FIG. 8 is a schematic diagram of another embodiment of an authentication method.

FIG. 8 illustrates another embodiment of an authentication method 800 that may be used between the OLT and the ONU. The authentication method 800 may be initiated by the ONU, e.g., the ONU 120. In the method 800, the steps 810, 820, 830, 840, 850, 860, and 870 may be substantially similar to the steps 210, 520, 220, 230, 240, 350, and 370 above, respectively. The method 800 may progress from step 860 to step 870 after a timeout period at the ONU after sending an upstream authenticate message.

Figure 9:
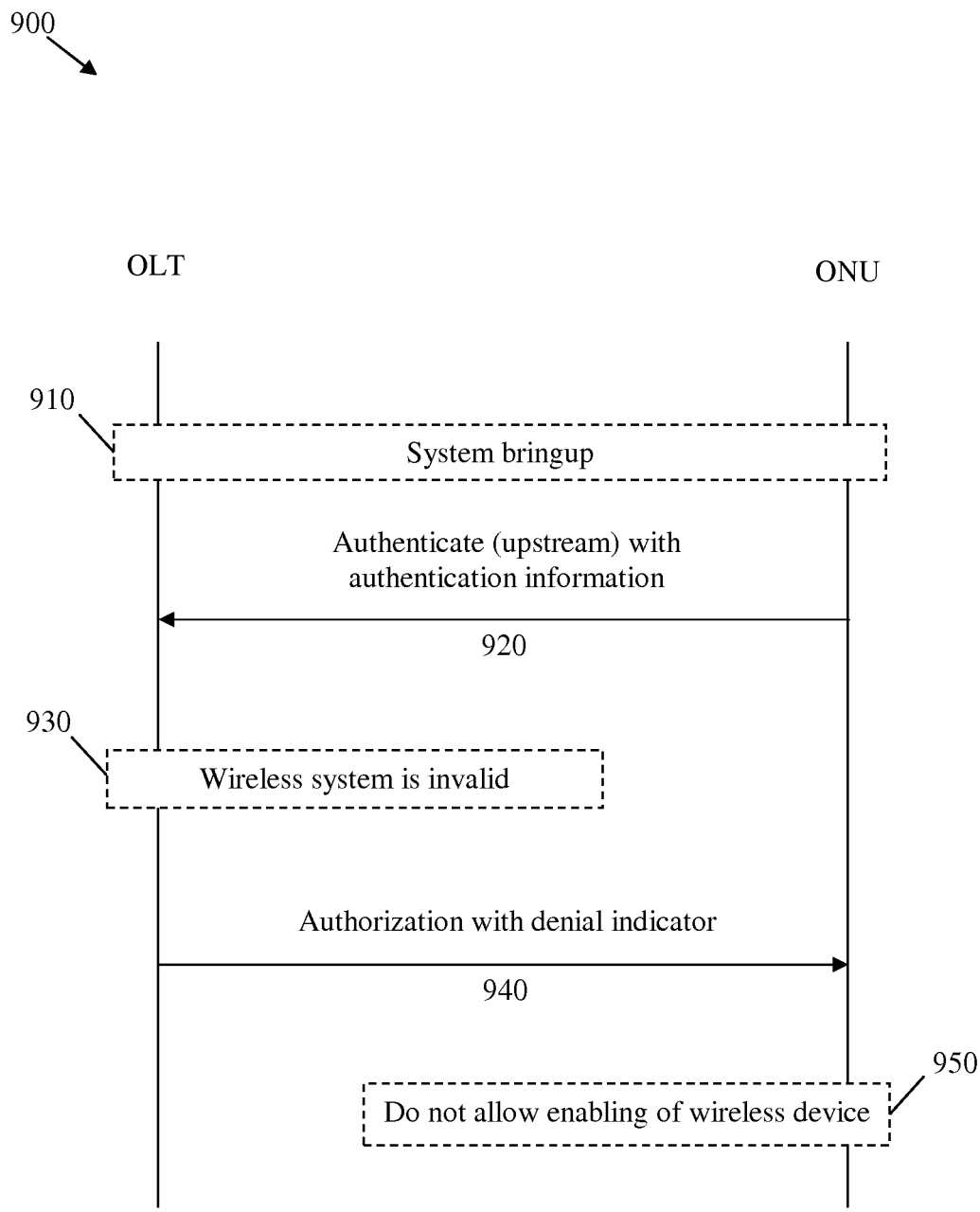
FIG. 9 is a schematic diagram of another embodiment of an authentication method.

FIG. 9 illustrates another embodiment of an authentication method 900 that may be used between the OLT and the ONU. The authentication method 900 may be initiated by the ONU, e.g., the ONU 120. In the method 900, the steps 910, 920, 930, 940, and 950 may be substantially similar to the steps 210, 240, 350, 360, and 370 above, respectively.

Figure 10:
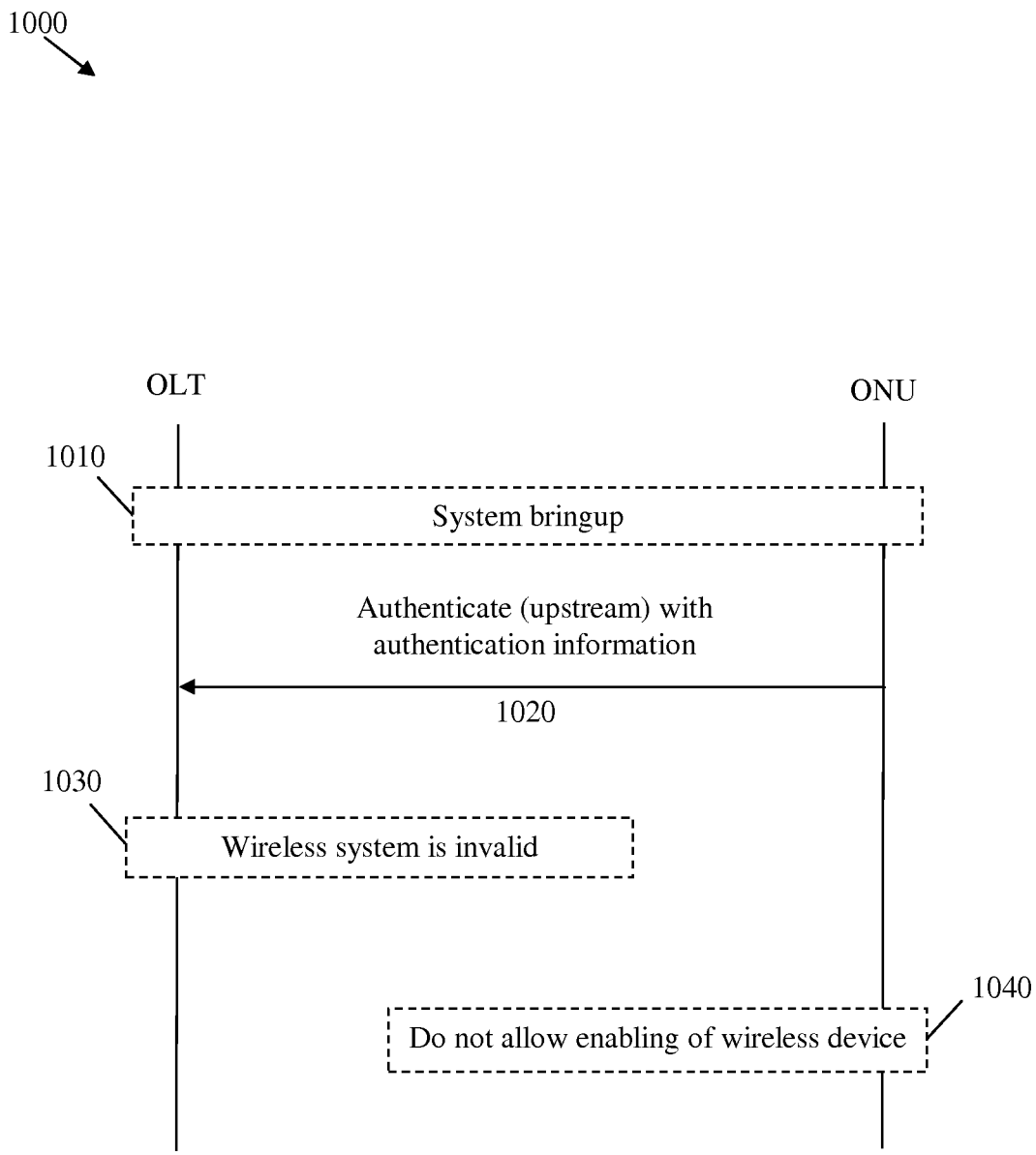
FIG. 10 is a schematic diagram of another embodiment of an authentication method.

FIG. 10 illustrates another embodiment of an authentication method 1000 that may be used between the OLT and the ONU. The authentication method 1000 may be initiated by the ONU, e.g., the ONU 120. In the method 1000, the steps 1010, 1020, 1030, and 1040 may be substantially similar to the steps 210, 240, 350, and 370 above, respectively. The method 1000 may progress from step 1030 to step 1040 after a timeout period at the ONU after sending an upstream authenticate message.

In the authentication methods above, the OLT may be the authenticator that authorizes the ONU to enable the wireless backup system if the authorization information from the ONU is valid. In other embodiments, the ONU may be the authenticator that authorizes the OLT if the authorization information from the OLT is valid, as described in the methods below.

Figure 11:
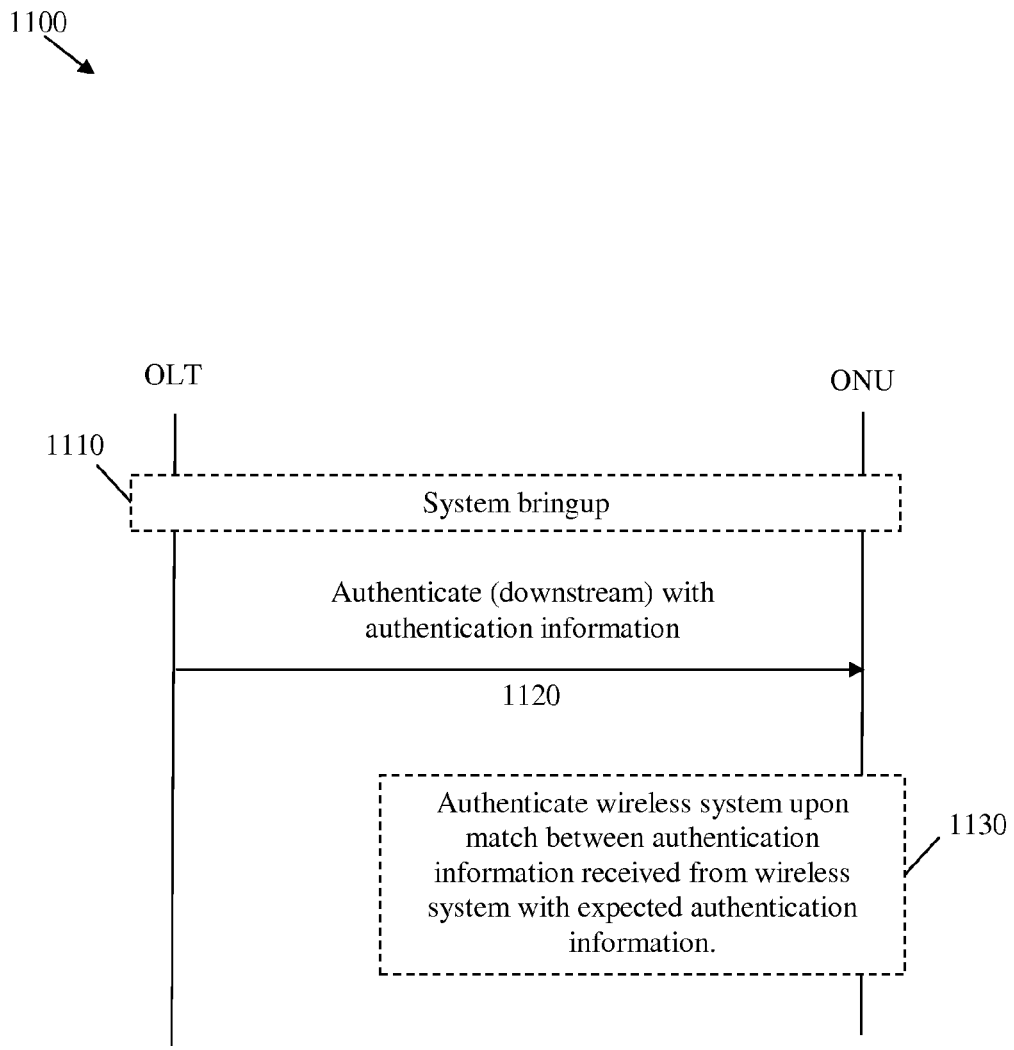
FIG. 11 is a schematic diagram of another embodiment of an authentication method.

FIG. 11 illustrates another embodiment of an authentication method 1100 that may be used between an OLT and an ONU in a PON, e.g., in the PON 100. The authentication method 1100 may be initiated by the OLT, e.g., the OLT 110. The authentication method 1100 may begin at step 1110, which may be configured substantially similar to step 210. At step 1120, the OLT may send a downstream authenticate message comprising authentication information to the ONU. The authentication information may comprise substantially similar information as the authentication information used in step 230. At step 1130, after receiving the authentication information, the ONU may compare the authentication information from the OLT with authentication information that may be read from the wireless device associated with the ONU. The authentication information may be read from the wireless device after the ONU powers up or during the comparison at step 1130. If a match between the received and read authentication information is detected, then the wireless device may be enabled.

Figure 12:
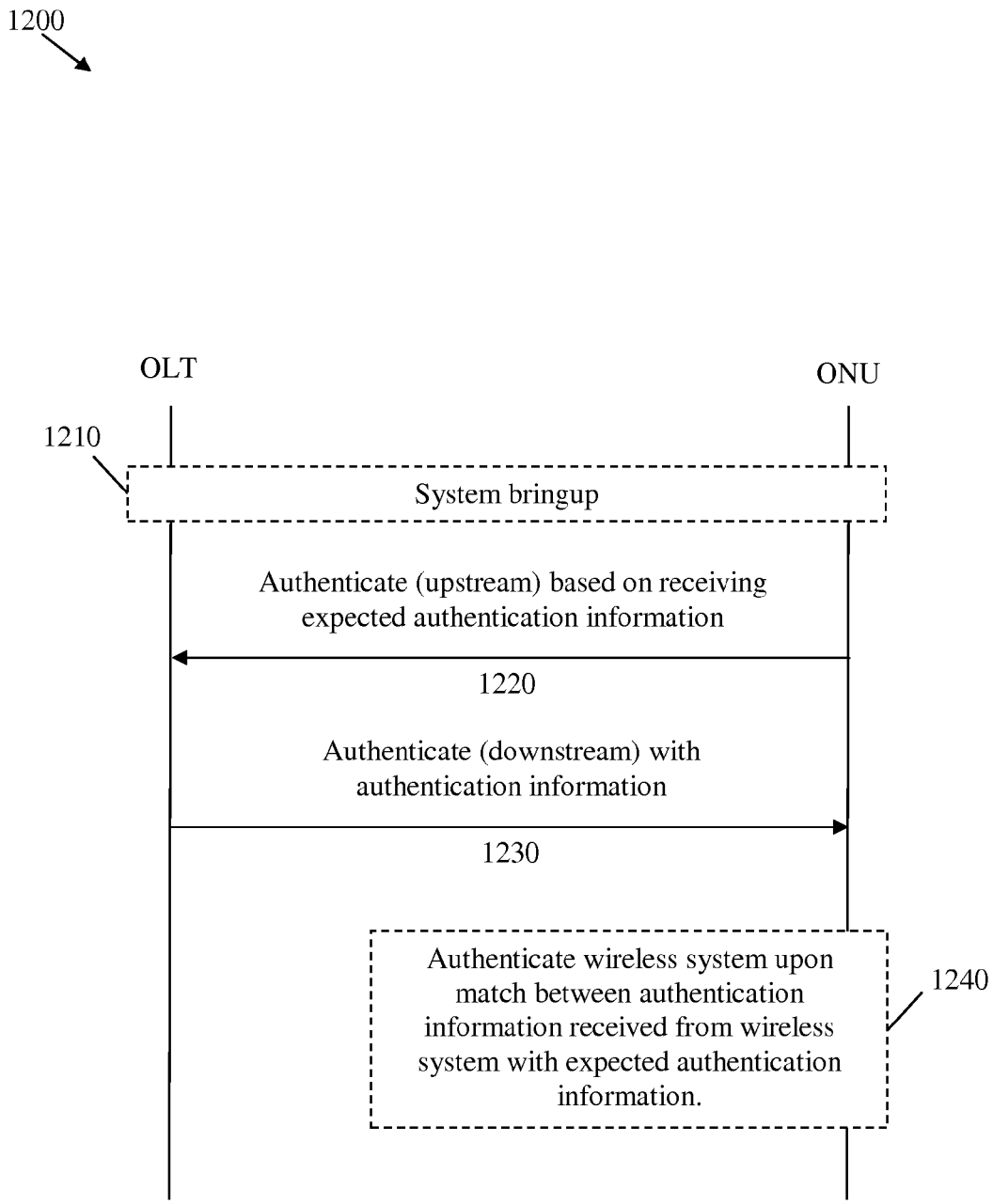
FIG. 12 is a schematic diagram of another embodiment of an authentication method.

FIG. 12 illustrates another embodiment of an authentication method 1200 that may be used between the OLT and the ONU. The authentication method 1200 may be initiated by the ONU, e.g., the ONU 120. The authentication method 1200 may begin at step 1210, which may be substantially similar to step 210. At step 1220, the ONU may send an upstream authenticate message to request an authentication information from the OLT. At step 1230, the OLT may send a downstream authenticate message that comprises the requested authentication information to the ONU. The authentication information may comprise substantially similar information as the authentication information sent in step 230. In the method 1200, the step 1240 may be substantially similar to the step 1130 above.

In addition to the methods described above, the ONU may be preloaded with expected authentication information at deployment. Preloading may be performed during the manufacturing process, or during a staging process used by the operator, or both. If the ONU comprises preloaded authentication information, the wireless backup system may be authenticated and a wireless device coupled to the wireless backup system may be enabled during the ONU power-up stage, before a PON link may be available.

The authentication methods described above may be implemented using one or more available PON management channels and/or protocols such as, PLOAM, OMCI, MPCP, OAM, or combinations thereof. The PLOAM channel may be a message-based management channel between an OLT and an ONU that is defined in the ITU-T G.984.1 and G.987.3 standards, both of which are incorporated herein by reference. The PLOAM channel may support a plurality of PON Transmission Convergence (TC) layer management functions, such as ONU activation, Optical Network Terminal Management and Control Interface (OMCI) channel establishment, encryption configuration, key management, and alarm signaling. A plurality of PLOAM messages may be used and exchanged between the OLT and the ONU in any of the methods above. The PLOAM messages may comprise a downstream authenticate message transmitted from the OLT, an upstream authenticate message transmitted from the ONU, and an authorization message that may be used in the downstream direction. Table 1 illustrates an embodiment of a downstream authenticate message, Table 2 illustrates an embodiment of an upstream authenticate message, and Table 3 illustrates an embodiment of an authorization message in the downstream direction.

Table 1 shows a plurality of parameters or elements that may be included in the PLOAM downstream authenticate message. The "Octet" column indicates the position of an octet or byte in the message. The "Content" column indicates the content of one or more fields in the message. For instance, an ONU identifier (ONU-ID) may occupy a first octet or byte of the message, and may indicate a receiving ONU. A message identification (abcdwxyz) may occupy a second octet of the message, and may identify the message as an "authenticate" message. An authentication information (pppppppp) may occupy a third octet of the message, and may indicate a first part (part 1) of the authentication information. An authentication information (pppppppp) may occupy a fourth octet to an eleventh octet of the message, and may indicate a second to a ninth part (part 2-9) of the authentication information. An authentication information (pppppppp) may occupy a twelfth octet of the message and may indicate a tenth part (part 10) of the authentication information.

TABLE 1

Downstream authenticate message

| Octet | Content | Description |
|---|---|---|
| 1 | ONU-ID | ONU identifier, indicating a receiving ONU |
| 2 | abcdwxyz | Message identification, "authenticate" |
| 3 | pppppppp | Authentication information, part 1 |
| 4-11 | pppppppp | Authentication information, part 2-9 |
| 12 | pppppppp | Authentication information, part 10 |

Table 2 shows a plurality of parameters or elements that may be included in the PLOAM upstream authenticate message. The "Octet" column indicates to the position of the octet or byte in the message. The "Content" column indicates the content of one or more fields in the message. The content elements of the PLOAM upstream authenticate message may be substantially similar to the content elements of the PLOAM downstream authenticate message and may occupy similar octet or byte locations as described in Table 1.

TABLE 2

Upstream authenticate message

| Octet | Content | Description |
|---|---|---|
| 1 | ONU-ID | ONU Identifier, indicating sending ONU |
| 2 | abcdwxyz | Message identification, "authenticate" |
| 3 | pppppppp | Authentication information, part 1 |
| 4-11 | pppppppp | Authentication information, part 1-9 |
| 12 | pppppppp | Authentication information, part 10 |

Table 3 shows a plurality of parameters or elements that may be included in the PLOAM authorization message. The "Octet" column indicates the position of byte in the message. As shown in Table 3, the first and second content elements that occupy the first and second octets, respectively, of the PLOAM authorization message may be substantially similar to the content elements described in Table 1. An accepted/denial indicator (accepted/denial) may occupy a third octet of the message. The accepted/denial indicator may have a value of about zero that indicates an accepted authentication, or a value of about one that indicates a denied authentication. An unspecified indicator (unspecified) may occupy a fourth octet to a twelfth octet of the message, which may not be used.

TABLE 3

Authorization message

| Octet | Content | Description |
| --- | --- | --- |
| 1 | ONU-ID | ONU Identifier, indicating receiving ONU |
| 2 | abcdwxyz | Message identification, "authenticate" |
| 3 | accepted/denial | 0 = accepted, 1 = denial |
| 4-12 | unspecified | |

The OMCI channel may be a message-based management channel between an OLT and an ONU that is defined in the ITU-T G.984.4 and the ITU-T G.988 standards, both of which are incorporated herein by reference. An OMCI managed entity (ME), referred to herein as a "wireless backup system authentication ME", may be maintained or stored at the ONU or the OLT. The OMCI ME may comprise information for authenticating a wireless backup system for the PON, where one instance of the OMCI ME may be associated with an ONU ME. The OMCI ME may comprise a plurality of attributes, which may be exchanged between the OLT and the ONU in any of the methods above. Table 4 shows some of the attributes that may be included in the OMCI ME and their description. The column "Attribute" indicates the attributes. The OMCI ME attributes may comprise a managed entity identifier, actual authentication information, expected authentication information, an authentication status, and an operational state.

TABLE 4

OMCI ME object attributes

| Attribute | Description |
| --- | --- |
| Managed entity identifier | The value of this attribute may identify each instance of the OMCI ME. The value of an instance identifier may be about zero. The attribute may be readable, mandatory, and may comprise about two bytes. |
| Actual authentication information | The value of this attribute may comprise authentication information received from a wireless backup system. If there is no backup, the value of the attribute may be about zero. The attribute may be readable, mandatory, and may comprise about four bytes. |
| Expected authentication information | The value of this attribute may comprise expected authentication information for a wireless backup system. If the OLT 110 is not ready to authenticate the wireless backup system, or upon ME instantiation, the value of the attribute may be about zero. The attribute may be readable and writeable, mandatory, and comprise about four bytes. |
| Authentication status | The value of this attribute may report the status of an authentication result. A value of about zero may indicate a failure of the authentication. A value of about one may indicate a success of the authentication. The attribute may be readable and writeable, mandatory, and may comprise about one byte. |
| Operational state | The value of this attribute may indicate whether or not the ME is capable of performing its function. A value of about zero may indicate an enabled status, and a value of about one may indicate an disabled status. The attribute may be readable and writeable, mandatory, and may comprise about one byte. |

A plurality of actions may be associated with the OMCI ME attributes above. The actions may comprise a "get" action for reading an OMCI ME attribute value from a memory device, and a "set" action for writing an OMCI ME attribute value to a memory device. Additionally, a plurality of notifications of attribute value change may be signaled in the OMCI channel. Table 5 below shows some of the attribute value changes that may be signaled. The "number" indicates a notification value for an attribute value change. For instance, a notification value of about one may not be available (N/A) or may not be used. A notification value of about two may signal authentication information change, e.g., when a new wireless device has been inserted into the ONU. A notification value of about three may signal an authentication status may have changed. A notification value of about four may signal a change in operational status. A notification value of about five to about 16 may not be available (N/A) or may not be used.

TABLE 5

Attributes value change

| Number | Attribute value change | Description |
| --- | --- | --- |
| 1 | Not available | |
| 2 | Authentication information change | New wireless device may have been inserted into the ONU. |
| 3 | Authentication status change | The authentication status may have changed. |
| 4 | op status | Operational state change. |
| 5 ... 16 | Not available | |

In EPON and Gigabit EPON (GEPON) systems, a plurality of protocol extensions may be used to implement the authentication methods, such as MPCP extensions and/or OAM extensions. Tables 6, 7, and 8 below illustrate embodiments of MPCP extensions if the authentication is done by the OLT. Table 6 shows a plurality of parameters or elements that may be included in the MPCP extensions. An extension "Destination Address" may occupy about a six octets in the message, and may indicate a destination to which an authenticate message may be sent. An extension "Source Address" may occupy about six octets in the message, and may indicate a source from which an authenticate message may be sent. An extension "Length/Type" may occupy about two octets in the message, and may indicate a length and a type of the message. An extension "Opcode" may occupy about two octets in the message, and may indicate the operational code of the message. The operational code may indicate that the OLT may request the ONU to send an authentication information. An extension "Timestamp" may occupy about four octets in the message, and may indicate a timestamp. For example, the timestamp may indicate a standardized time associated with the message. The extension "Reserved" may occupy about 40 octets in the message, and may remain undefined. The extension "FCS" may occupy about four octets in the message, and may indicate a frame check sequence (FCS). For example, the value of the FCS extension may comprise a result of a checksum operation.

TABLE 6

MPCP extensions

| Octet | Content | Description |
|---|---|---|
| 6 | Destination Address | The value of this extension may indicate a destination address, for example, an address to which an authenticate message may be sent. |
| 6 | Source Address | The value of this extension may indicate a source address, for example, an address from which an authenticate message may be sent. |
| 2 | Length/Type = 88-08 | The value of this extension may indicate a length and/or type, for example, a length and/or type associated with an authenticate message. |
| 2 | Opcode = 00-07 | The value of this extension may indicate that the OLT 110 may request the ONU 120 to send authentication information associated with the wireless backup system. |
| 4 | Timestamp | The value of this extension may indicate a timestamp. |
| 40 | Reserved | The value of this extension may be reserved. |
| 4 | FCS | The value of this extension may indicate a frame check sequence (FCS). |

Table 7 shows another embodiment of a plurality of parameters or elements that may be included in the MPCP extensions. The first, second and third elements in Table 7 may be configured substantially similar to their corresponding elements in Table 6. The extension "Opcode" may occupy about two octets in the message, and may indicate the operational code of the message. The operational code may indicate that the ONU may indicate the authentication information to the OLT. The extension "IMSI" may occupy about two octets in the message, and may indicate at least part of an IMSI of a 3G card. The remaining extensions in Table 7 may be configured substantially similar to their corresponding extensions in Table 6.

TABLE 7

MPCP extensions

| Octet | Content | Description |
|---|---|---|
| 6 | Destination Address | The value of this extension may indicate a destination address, for example, an address to which an authenticate message may be sent. |
| 6 | Source Address | The value of this extension may indicate a source address, for example, an address from which an authenticate message may be sent. |
| 2 | Length/Type = 88-08 | The value of this extension may indicate a length and/or type, for example, a length and/or type associated with an authenticate message |
| 2 | Opcode = 00-08 | The value of this extension may indicate that the ONU 120 may indicate the authentication information to the OLT 110. |
| 4 | Timestamp | The value of this extension may indicate a timestamp. |
| 2 | IMSI | The value of this extension may correspond to the IMSI. Only the first 15 bits may be used, the last bit may be reserved. The first three digits may correspond to the Mobile Country Code (MCC), and may be followed by the Mobile Network Code (MNC), either two digits (European standard) or three digits (North American standard). The remaining digits may be reserved.. |
| 38 | Reserved | The value of this extension may be reserved. |
| 4 | FCS | The value of this extension may indicate a FCS. |

Table 8 shows another embodiment of a plurality of parameters or elements that may be included in the MPCP extensions. The first, second and third elements in Table 8 may be configured substantially similar to their corresponding elements in Table 6. The extension "Opcode" may occupy about two octets in the message, and may indicate the operational code of the message. The operational code may indicate that the OLT may return an authorization result to the ONU. The remaining extensions in Table 8 may be configured substantially similar to their corresponding extensions in Table 6.

TABLE 8

MPCP extensions

| Octets | Content | Description |
|---|---|---|
| 6 | Destination Address | The value of this extension may indicate a destination address, for example, an address to which an authenticate message may be sent. |
| 6 | Source Address | The value of this extension may indicate a source address, for example, an address from which an authenticate message may be sent. |
| 2 | Length/Type = 88-08 | The value of this extension may indicate a length and/or type, for example, a length and/or type associated with an authenticate message. |
| 2 | Opcode = 00-09 | The value of this extension may indicate that the OLT 110 may return an authentication result, for example, "successful" or "failed" to the ONU 120. |
| 4 | Timestamp | The value of this extension may indicate a timestamp. |
| 1 | Flag | The value of this extension may indicate the authentication result. A value of about one may indicate that the authentication was successful, and a value of about zero may indicate that authentication failed. Other values may be reserved. |
| 39 | Reserved | The value of this extension may be reserved. |
| 4 | FCS | The value of this extension may indicate a FCS. |

Tables 9, 10, and 11 illustrate embodiments of MPCP extensions when the authentication is performed by the ONU. The first, second and third elements in Table 9 may be configured substantially similar to their corresponding elements in Table 6. The extension "Opcode" may occupy about two octets in the message, and may indicate the operational code of the message. The operational code may indicate that the ONU may request the OLT to send authentication information. The extension "Flag" may occupy about one octet in the message, and may indicate an authentication result. For example, the Flag extension may be equal to about one if the authentication was successful, and to about zero if the authentication failed. The remaining extensions in Table 9 may be configured substantially similar to their corresponding extensions in Table 6.

TABLE 9

MPCP extensions

| Octets | Content | Description |
|---|---|---|
| 6 | Destination Address | The value of this extension may indicate a destination address, for example, an address to which an authenticate message may be sent. |
| 6 | Source Address | The value of this extension may indicate a source address, for example, an address from which an authenticate message may be sent. |
| 2 | Length/Type = 88-08 | The value of this extension may indicate a length and/or type, for example, a length and/or type associated with an authenticate message. |

TABLE 9-continued

MPCP extensions

| Octets | Content | Description |
| --- | --- | --- |
| 2 | Opcode = 00-07 | The value of this extension may indicate that the ONU 120 may request the OLT 110 to report an authentication information. |
| 4 | Timestamp | The value of this extension may indicate a timestamp. |
| 40 | Reserved | The value of this extension may be reserved. |
| 4 | FCS | The value of this extension may indicate a FCS. |

Table 10 shows another embodiment of a plurality of parameters or elements that may be included in the MPCP extensions. The first, second and third elements in Table 10 may be configured substantially similar to their corresponding elements in Table 6. The extension "Opcode" may occupy about two octets in the message, and may indicate the operational code of the message. The operational code may indicate that the OLT send authentication information to the ONU. The remaining extensions in Table 10 may be configured substantially similar to their corresponding extensions in Table 6.

TABLE 10

MPCP extensions

| Octets | Content | Description |
| --- | --- | --- |
| 6 | Destination Address | The value of this extension may indicate a destination address, for example, an address to which an authenticate message may be sent. |
| 6 | Source Address | The value of this extension may indicate a source address, for example, an address from which an authenticate message may be sent. |
| 2 | Length/Type = 88-08 | The value of this extension may indicate a length and/or type, for example, a length and/or type associated with an authenticate message. |
| 2 | Opcode = 00-08 | The value of this extension may indicate that the OLT 110 may send an authentication information to the ONU 120. Unicast and/or multicast may be supported. |
| 4 | Timestamp | The value of this extension may indicate a timestamp. |
| 2 | IMSI | The value of this extension may correspond to the IMSI. Only the first 15 bits may be used, the last bit may be reserved. The first three digits may correspond to the Mobile Country Code (MCC), and may be followed by the Mobile Network Code (MNC), either two digits (European standard) or three digits (North American standard). The remaining digits may be reserved. |
| 38 | Reserved | The value of this extension may be reserved. |
| 4 | FCS | The value of this extension may indicate a FCS. |

Table 11 shows another embodiment of a plurality of parameters or elements that may be included in the MPCP extensions. The first, second and third elements in Table 11 may be configured substantially similar to their corresponding elements in Table 6. The extension "Opcode" may occupy about two octets in the message, and may indicate the operational code of the message. The operational code may indicate that the ONU may return an authorization result to the OLT. The remaining extensions in Table 11 may be configured substantially similar to their corresponding extensions in Table 6.

TABLE 11

MPCP extensions

| Octets | Content | Description |
| --- | --- | --- |
| 6 | Destination Address | The value of this extension may indicate a destination address, for example, an address to which an authenticate message may be sent. |
| 6 | Source Address | The value of this extension may indicate a source address, for example, an address from which an authenticate message may be sent. |
| 2 | Length/Type = 88-08 | The value of this extension may indicate a length and/or type, for example, a length and/or type associated with an authenticate message. |
| 2 | Opcode = 00-09 | The value of this extension may indicate that the ONU 120 may return an authentication result to the OLT 110. This message may be optional. |
| 4 | Timestamp | The value of this extension may indicate a timestamp. |
| 1 | Flag | The value of this extension may indicate the authentication result. A value of about one may indicate that the authentication was successful, and a value of about zero may indicate that authentication failed. Other values may be reversed. |
| 39 | Reserved | The value of this extension may be reserved. |
| 4 | FCS | The value of this extension may indicate a FCS. |

Table 12 shows a plurality of attributes that may be used in the OAM extensions to support the authentication methods above, and the attributes' description. The attributes may comprise actual authentication information that may occupy about four octets in the message, expected authentication information that may occupy about four octets in the message, an authentication status that may occupy about one octet in the message, and an operational state that may occupy about one octet in the message.

TABLE 12

OAM attributes list

| Octets | Attribute | Description |
| --- | --- | --- |
| 4 | Actual authentication information | The value of this attribute may correspond to the authentication information of wireless backup system. The value of the attribute may be about zero if there is no such backup. |
| 4 | Expected authentication information | The value of this attribute may provide the expected authentication information for the wireless backup system. A value of about zero may indicate that the OLT is not ready to authenticate the wireless backup system. Upon ONU activation, the ONU may set the value of this attribute to about zero. |
| 1 | Authentication status | The value of this attribute may indicate the status of the authentication result. A value of about one may indicate that the authentication was successful, and a value of about zero may indicate that authentication failed. |
| 1 | Operational state | The value of this attribute may indicate whether or not the ME is capable of performing its function. A value of about zero may indicate enabled, and a value of about one may indicate disabled. |

Additionally or alternatively, in some embodiments, an Ethernet OAM message may be used in the authentication process, e.g., in any of the methods above, and the structure of the message may be substantially similar to the structure of an extended OAM message, but may comprise different subtypes than the OAM message.

Figure 13:
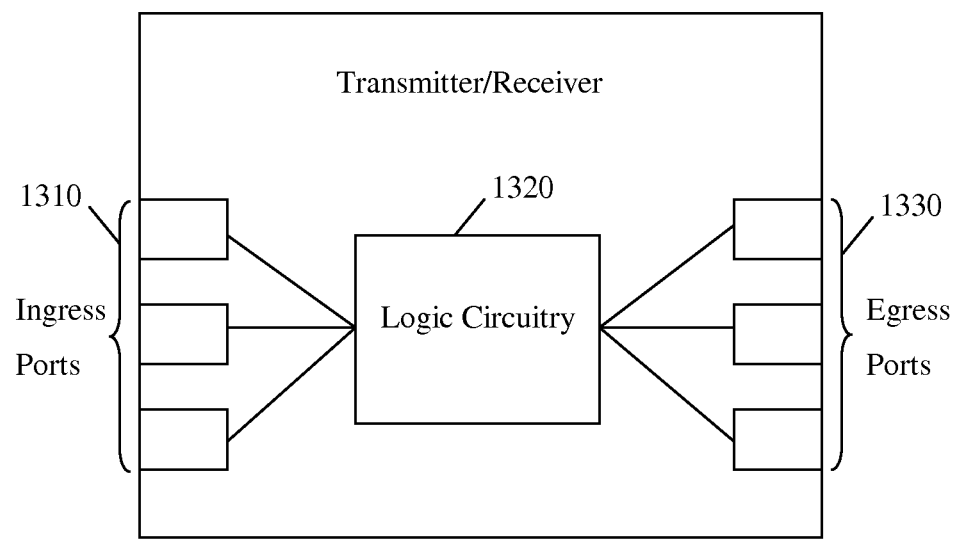
FIG. 13 is a schematic diagram of an embodiment of a transmitter/receiver unit.

FIG. 13 illustrates an embodiment of a transmitter/receiver unit 1300, which may be any device that transports data through a network. For instance, the transmitter/receiver unit 1300 may be located in the OLT 110 or the ONU 120 in the schemes described above. The transmitted/receiver unit 1300 may comprise one or more ingress ports or units 1310 for receiving sequences of data that comprise bits or words, e.g., a plurality of authenticate and/or authorization messages, logic circuitry 1320 to perform transceiver data operations, and one or more egress ports or units 1330 for transmitting the data to other network components. Some of the ingress ports and similarly the egress ports may be coupled to PON or optical links and other ingress ports and egress ports may be coupled to backup wireless links. The logic circuitry 1320 may also comprise simple logic to perform control and/or data monitor, as described in the schemes above. For instance, the logic circuitry may comprise or correspond to a hardware component within the ONU 120 that is configured to compare the expected authentication information with the actual authentication information.

Figure 14:
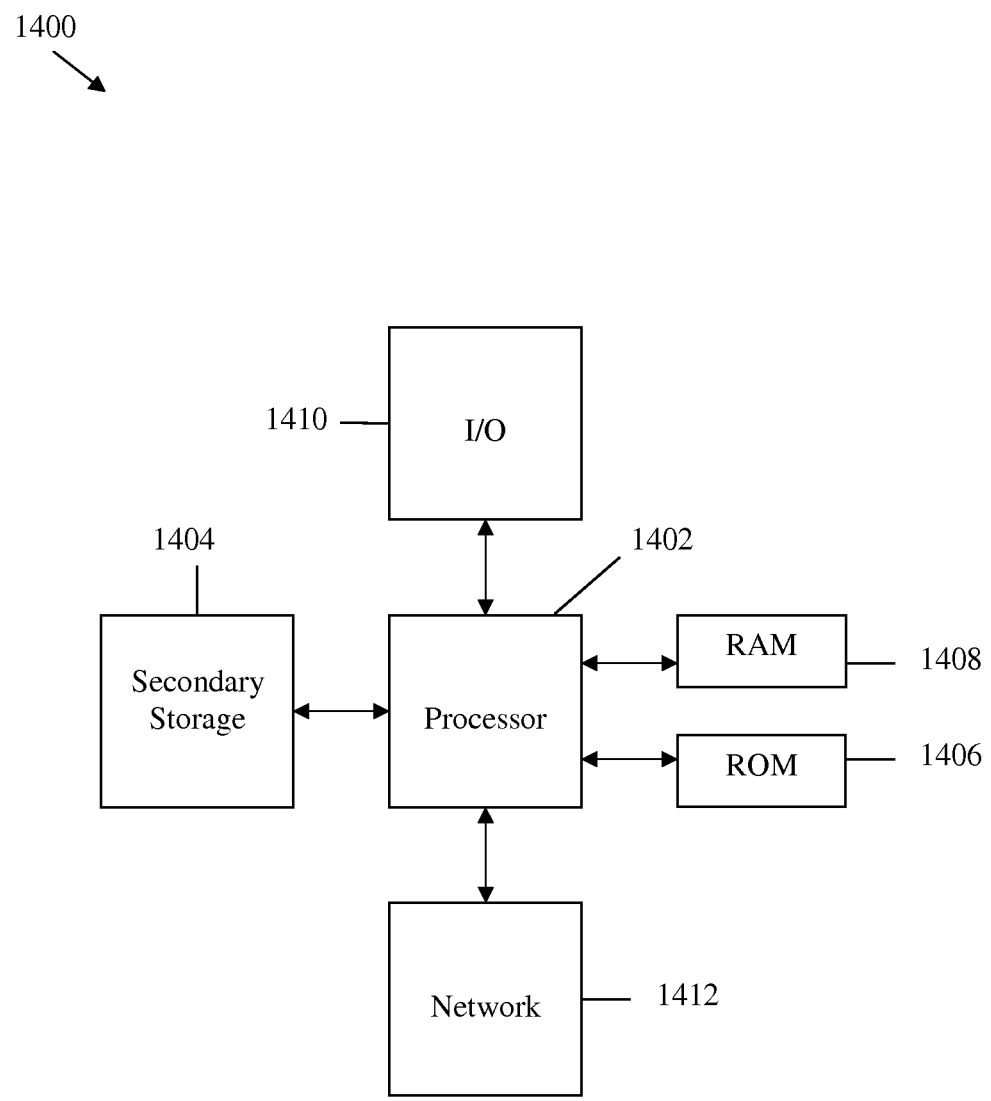
FIG. 14 is a schematic diagram of an embodiment of a general-purpose computer system.

The network components described above may be implemented on any general-purpose network component, such as a computer or network component with sufficient processing power, memory resources, and network throughput capability to handle the necessary workload placed upon it. FIG. 14 illustrates a typical, general-purpose network component 1400 suitable for implementing one or more embodiments of the components disclosed herein. The network component 1400 includes a processor 1402 (which may be referred to as a central processor unit or CPU) that is in communication with memory devices including secondary storage 1404, read only memory (ROM) 1406, random access memory (RAM) 1408, input/output (I/O) devices 1410, and network connectivity devices 1412. The processor 1402 may be implemented as one or more CPU chips, or may be part of one or more Application-Specific Integrated Circuits (ASICs).

The secondary storage 1404 is typically comprised of one or more disk drives or tape drives and is used for non-volatile storage of data and as an overflow data storage device if RAM 1408 is not large enough to hold all working data. Secondary storage 1404 may be used to store programs that are loaded into RAM 1408 when such programs are selected for execution. The ROM 1406 is used to store instructions and perhaps data that are read during program execution. ROM 1406 is a non-volatile memory device that typically has a small memory capacity relative to the larger memory capacity of secondary storage 1404. The RAM 1408 is used to store volatile data and perhaps to store instructions. Access to both ROM 1406 and RAM 1408 is typically faster than to secondary storage 1404.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 5, 4, etc.; greater than 0.10 includes 0.11, 0.12, 0.15, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 5 percent, 4 percent, 5 percent, . . . , 50 percent, 51 percent, 52 percent, . . . , 75 percent, 76 percent, 77 percent, 78 percent, 77 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. An apparatus comprising:
a first passive optical network (PON) component configured to:
couple to a second PON component via an optical link; and
authenticate the second PON component, based on a physical layer operations, administration, and maintenance (PLOAM) authenticate message, to authorize a backup wireless link,
wherein the backup wireless link corresponds to a wireless backup system for a PON, and
wherein the message comprises a first octet comprising a first identifier (ID) indicating either the first PON component or the second PON component, a second octet comprising an authenticate message identification, and at least a third octet comprising authentication information associated with a second ID of the wireless backup system.

2. The apparatus of claim 1, wherein the first PON component is an optical line terminal (OLT) and the second PON component is an optical network unit (ONU).

3. The apparatus of claim 1, wherein the first PON component is an optical network unit (ONU) and the second PON component is an optical line terminal (OLT).

4. The apparatus of claim 1, wherein the wireless backup system is one of a third generation (3G) wireless system and a fourth generation (4G) wireless system.

5. The apparatus of claim 1, wherein the authentication information comprises a first four bytes of an International Mobile Subscriber Identity (IMSI) of a Third Generation (3G) card.

6. The apparatus of claim 1, wherein the second PON component comprises a plug-and-play wireless device or a built-in wireless device that is configured to activate the backup wireless link.

7. The apparatus of claim 1, wherein the authentication information is stored in a memory device at the second PON component, and wherein expected authentication information is stored at the first PON component or a server coupled to the first PON component.

8. The apparatus of claim 1, wherein the first PON component comprises one of a ten gigabit per second Gigabit PON (XGPON) component, an Ethernet PON (EPON) component defined by the Institute of Electrical and Electronics Engineers (IEEE) 802.3ah standard, a ten Gigabit EPON component as defined by the IEEE 802.3av standard, an asynchronous transfer mode PON (APON) component, a broadband PON (BPON) component as defined by the International Telecommunication Union (ITU) Standardization Sector (ITU-T) G.983 standard, and a Gigabit-capable Passive Optical Networks (GPON) component as defined by the ITU-T G.984 standard.

9. The apparatus of claim 1, wherein the wireless backup system conforms to at least one of the International Telecommunication Union (ITU) Standardization Sector (ITU-T) G.984.1 standard and the ITU-T G.987.1 standard.

10. A network component comprising:
a first passive optical network (PON) component configured to:
receive, from a second PON component, a physical layer operations, administration, and maintenance (PLOAM) authenticate message comprising a first identifier (ID) indicating the second PON component, a second octet comprising an authenticate message identification, and at least a third octet comprising authentication information associated with a second ID of a wireless backup system for a PON; and
compare the authentication information to expected authentication information at the first PON component to authorize a wireless link between the first PON component and the second PON component for the wireless backup system.

11. The network component of claim 10, wherein the first PON component is further configured to transmit a PLOAM authorization message comprising the first ID, a second octet comprising an authorization message identification, and at least a third octet indicating whether authorization is accepted or denied.

12. The network component of claim 10, wherein the first PON component is further configured to transmit and receive notifications to indicate a plurality of attribute value changes comprising authentication information change, authentication status change, and operational status change.

13. The network component of claim 10, wherein the wireless backup system conforms to at least one of the International Telecommunication Union (ITU) Standardization Sector (ITU-T) G.984.1 standard and the ITU-T G.987.1 standard.

14. A network apparatus implemented method comprising:
receiving, by the network apparatus, a physical layer operations, administration, and maintenance (PLOAM) authenticate message comprising a first octet comprising an optical network unit (ONU) identifier (ID) indicating a receiving ONU or a transmitting ONU, a second octet comprising an authenticate message identification, and at least a third octet comprising authentication information associated with an ID of a wireless backup system for a passive optical network (PON),
authorizing, by the network apparatus, a wireless backup link if expected authentication information for the wireless backup system is substantially similar to the authentication information; and
not establishing the wireless backup link if the expected authentication information for the wireless backup system is not substantially similar to the authentication information.

15. The method of claim 14, wherein the authentication information comprises at least the first four bytes of an International Mobile Subscriber Identity (IMSI).

16. The method of claim 14, wherein the wireless backup link conforms to at least one of the International Telecommunication Union (ITU) Standardization Sector (ITU-T) G.984.1 standard and the ITU-T G.987.1 standard.

* * * * *